(12) United States Patent
Park et al.

(10) Patent No.: US 10,832,655 B2
(45) Date of Patent: *Nov. 10, 2020

(54) METHOD AND USER DEVICE FOR PROVIDING CONTEXT AWARENESS SERVICE USING SPEECH RECOGNITION

(71) Applicant: Samsung Electronics Co., Ltd., Suwon-si, Gyeonggi-do (KR)

(72) Inventors: Jin Park, Yongin-si (KR); Jiyeon Jung, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,395

(22) Filed: Aug. 7, 2019

(65) Prior Publication Data

US 2019/0362705 A1 Nov. 28, 2019

Related U.S. Application Data

(63) Continuation of application No. 15/901,525, filed on Feb. 21, 2018, now Pat. No. 10,395,639, which is a
(Continued)

(30) Foreign Application Priority Data

Dec. 10, 2012 (KR) .................. 10-2012-0142624

(51) Int. Cl.
*G10L 15/00* (2013.01)
*G10L 15/22* (2006.01)
(52) U.S. Cl.
CPC ........ *G10L 15/00* (2013.01); *G10L 2015/228* (2013.01)

(58) Field of Classification Search
None
See application file for complete search history.

(56) References Cited

U.S. PATENT DOCUMENTS 4,532,648 A 7/1985 Noso et al.
5,826,233 A * 10/1998 Matsumoto ............. G10L 15/22
704/275
(Continued)

FOREIGN PATENT DOCUMENTS

CN 101930789 A 12/2010
CN 102164327 A 8/2011
(Continued)

OTHER PUBLICATIONS

Sean Hollister; Plug in Launcher for Android makes things happen when you connect USB or headphones; URL: https://web.archive.org/web/2011 0308002350/http://1www.engadget.com/2011/03/06/plug-in-launcher-for-androidautomatically-makes-apps-happen-whe/; Mar. 6, 2011; XP002727927.
(Continued)

*Primary Examiner* — Thuykhanh Le
(74) *Attorney, Agent, or Firm* — Jefferson IP Law, LLP

(57) ABSTRACT

A method for providing a context awareness service is provided. The method includes defining a control command for the context awareness service depending on a user input, triggering a playback mode and the context awareness service in response to a user selection, receiving external audio through a microphone in the playback mode, determining whether the received audio corresponds to the control command, and executing a particular action assigned to the control command when the received audio corresponds to the control command.

18 Claims, 8 Drawing Sheets

Related U.S. Application Data continuation of application No. 14/101,546, filed on Dec. 10, 2013, now Pat. No. 9,940,924.

(56) References Cited

U.S. PATENT DOCUMENTS

| | | | | |
|---|---|---|---|---|
| 7,684,828 B2 * | 3/2010 | Lee | ............. | H04M 1/72544 455/566 |
| 8,175,884 B1 * | 5/2012 | Morris | ............. | G10L 15/26 340/521 |
| 8,803,687 B2 * | 8/2014 | Valiulis | ............. | H04N 5/77 340/568.1 |
| 8,868,223 B1 * | 10/2014 | Sharifi | ............. | G06F 16/683 700/94 |
| 8,942,984 B2 | 1/2015 | Kim et al. | | |
| 9,197,736 B2 | 11/2015 | Davis et al. | | |
| 9,199,723 B2 | 12/2015 | Yamasaki | | |
| 9,251,793 B2 | 2/2016 | Lebeau et al. | | |
| 9,275,539 B2 * | 3/2016 | Kim | ............. | G08B 25/016 |
| 2002/0103651 A1 * | 8/2002 | Alexander | ............. | G10L 15/26 704/275 |
| 2002/0156830 A1 * | 10/2002 | Gayama | ............. | H04L 67/18 709/201 |
| 2005/0192061 A1 * | 9/2005 | May | ............. | G10L 13/00 455/563 |
| 2006/0167687 A1 | 7/2006 | Kates | | |
| 2007/0185601 A1 * | 8/2007 | Lee | ............. | G06F 3/16 700/94 |
| 2008/0059193 A1 * | 3/2008 | Huang | ............. | G10L 15/00 704/260 |
| 2008/0284587 A1 * | 11/2008 | Saigh | ............. | H04M 1/72541 340/539.13 |
| 2009/0018831 A1 * | 1/2009 | Morita | ............. | G10L 15/24 704/246 |
| 2009/0210227 A1 * | 8/2009 | Sugiyama | ............. | G10L 15/22 704/246 |
| 2010/0049500 A1 * | 2/2010 | Kobayashi | ............. | G10L 15/193 704/9 |
| 2010/0105364 A1 * | 4/2010 | Yang | ............. | H04M 1/72561 455/414.1 |
| 2010/0118158 A1 * | 5/2010 | Boland | ............. | H04N 5/23293 348/211.2 |
| 2010/0211972 A1 * | 8/2010 | Howarter | ............. | H04H 20/106 725/33 |
| 2010/0256785 A1 * | 10/2010 | Lloyd | ............. | G05B 19/0423 700/83 |
| 2010/0332003 A1 * | 12/2010 | Yaguez | ............. | G06F 3/165 700/94 |
| 2011/0059193 A1 | 3/2011 | Tournay et al. | | |
| 2011/0060591 A1 * | 3/2011 | Chanvez | ............. | H04M 3/42221 704/270 |
| 2011/0105190 A1 * | 5/2011 | Cha | ............. | G10L 15/26 455/566 |
| 2011/0106537 A1 * | 5/2011 | Funyak | ............. | G10L 13/02 704/260 |
| 2011/0153620 A1 * | 6/2011 | Coifman | ............. | G10L 15/065 707/748 |
| 2011/0156898 A1 | 6/2011 | Taillefer et al. | | |
| 2011/0161076 A1 * | 6/2011 | Davis | ............. | G06F 3/0488 704/231 |
| 2011/0195739 A1 * | 8/2011 | Deleus | ............. | H04W 4/00 455/518 |
| 2011/0206217 A1 | 8/2011 | Weis | | |
| 2011/0211680 A1 * | 9/2011 | Wilson | ............. | H04M 1/7255 379/88.23 |
| 2011/0252316 A1 * | 10/2011 | Pahud | ............. | G06F 40/58 715/264 |
| 2011/0257973 A1 * | 10/2011 | Chutorash | ............. | B60R 16/0373 704/235 |
| 2012/0034904 A1 * | 2/2012 | LeBeau | ............. | H04W 4/046 455/414.1 |
| 2012/0069131 A1 * | 3/2012 | Abelow | ............. | G06Q 10/067 348/14.01 |
| 2012/0084025 A1 * | 4/2012 | van Schie | ............. | G05D 9/12 702/55 |
| 2012/0089401 A1 * | 4/2012 | Hymel | ............. | G10L 15/1822 704/260 |
| 2012/0096018 A1 * | 4/2012 | Metcalf | ............. | H04N 21/47202 707/758 |
| 2012/0135685 A1 * | 5/2012 | Higgins | ............. | H04B 1/385 455/41.2 |
| 2012/0169454 A1 | 7/2012 | Petersen et al. | | |
| 2012/0176313 A1 * | 7/2012 | Ryu | ............. | H04N 21/4415 345/158 |
| 2012/0245944 A1 | 9/2012 | Gruber et al. | | |
| 2012/0295562 A1 * | 11/2012 | Sorensen | ............. | H03G 3/3089 455/127.2 |
| 2012/0313849 A1 * | 12/2012 | Bak | ............. | G06F 3/167 345/156 |
| 2013/0054237 A1 * | 2/2013 | Furman | ............. | G10L 15/26 704/235 |
| 2013/0060379 A1 | 3/2013 | Choe et al. | | |
| 2013/0117027 A1 * | 5/2013 | Choi | ............. | G10L 15/26 704/275 |
| 2013/0124206 A1 * | 5/2013 | Rezvani | ............. | G06T 13/40 704/270 |
| 2013/0124984 A1 * | 5/2013 | Kuspa | ............. | H04N 21/4307 715/255 |
| 2013/0173270 A1 * | 7/2013 | Han | ............. | G06F 3/167 704/275 |
| 2013/0204445 A1 * | 8/2013 | Ikeda | ............. | G05F 5/00 700/286 |
| 2013/0238341 A1 * | 9/2013 | You | ............. | G10L 25/48 704/275 |
| 2013/0262096 A1 * | 10/2013 | Wilhelms-Tricarico | ............. | G10L 13/04 704/202 |
| 2013/0322634 A1 * | 12/2013 | Bennett | ............. | G06F 3/04815 381/17 |
| 2014/0072137 A1 | 3/2014 | Nelson | | |
| 2014/0122070 A1 * | 5/2014 | Prus | ............. | G08G 5/0021 704/235 |
| 2015/0051913 A1 | 2/2015 | Choi | | |

FOREIGN PATENT DOCUMENTS

| | | |
|---|---|---|
| CN | 105625219 A | 8/2012 |
| CN | 102668391 A | 9/2012 |
| EP | 0 078 014 A1 | 5/1983 |
| EP | 2 267 695 A2 | 12/2010 |
| JP | 2007-334968 A | 12/2007 |
| JP | 2011-008263 A | 1/2011 |
| KR | 10-2007-0096028 A | 10/2007 |
| KR | 10-2013-0100280 A | 9/2013 |
| WO | 2007/019476 A1 | 2/2007 |

OTHER PUBLICATIONS

Korean Office Action with English translation dated Aug. 28, 2019; Korean Appln. No. 10-2012-0142624.

Chinese Office Action with English translation dated Sep. 3, 2020; Chinese Appln. No. 201810181943.7.

* cited by examiner

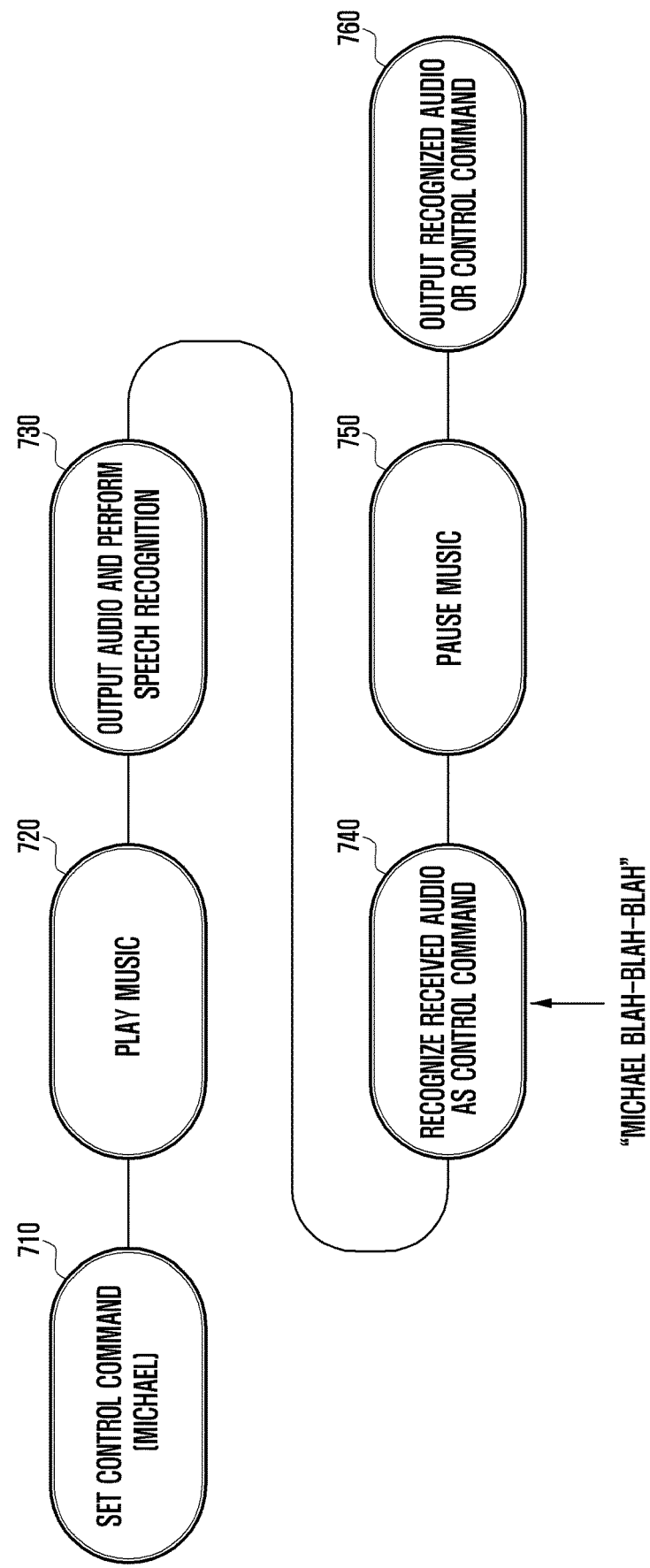

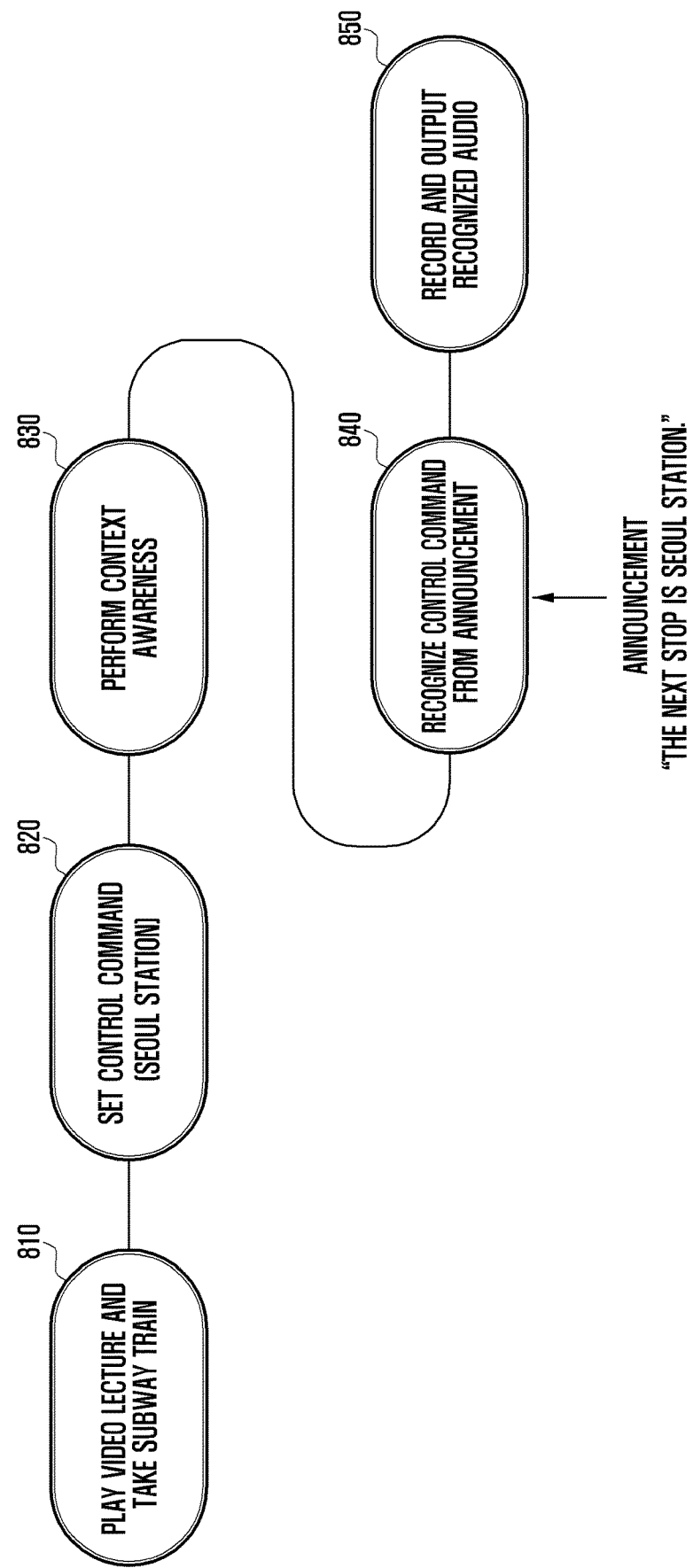

METHOD AND USER DEVICE FOR PROVIDING CONTEXT AWARENESS SERVICE USING SPEECH RECOGNITION

CROSS-REFERENCE TO RELATED APPLICATION(S)

This application is a continuation application of prior application Ser. No. 15/901,525, filed on Feb. 21, 2018, which is a continuation of prior application Ser. No. 14/101,546, filed on Dec. 10, 2013, which has issued as U.S. Pat. No. 9,940,924 on Apr. 10, 2018 and was based on and claimed priority under 35 U.S.C. § 119(a) of a Korean patent application number 10-2012-0142624, filed on Dec. 10, 2012, in the Korean Intellectual Property Office, the entire disclosure of each of which is hereby incorporated by reference herein in its entirety.

TECHNICAL FIELD

The present disclosure relates to a technique to provide a context awareness service. More particularly, the present disclosure relates to a method and user device for being aware of user-defined context through speech recognition in a state of connection between a user device and a headset, automatically executing a specific action assigned to the user-defined context, and giving feedback to a user.

BACKGROUND

With the remarkable growth of digital technologies, a variety of user devices such as a Personal Digital Assistant (PDA), an electronic organizer, a smart phone, a tablet Personal Computer (PC), or the like, which allow for communication and data processing in mobile environments, have become increasingly popular. Such user devices have outgrown their respective traditional fields and have reached a convergence stage. For example, user devices may offer many helpful functions, including a voice/video call function, a message transmission function, such as a Short Message Service (SMS), a Multimedia Message Service (MMS), an email, a navigation function, a digital camera function, a broadcast receiving function, a media (including video and music) playback function, an internet access function, a messenger function, a Social Networking Service (SNS) function, or the like.

Various techniques of recording a personal life as digital information (e.g., a "life-log") have been recently developed, which have aroused interest in a context awareness service. Normally, a context awareness service determines the content of a service and whether to provide a service, depending on a variation in context defined by a service object (e.g., a user). Context refers to information used to determine a particular service action defined by a service object, and may include a time to provide a service, whether to provide a service, a target for a service, a location to provide a service, and the like.

A typical context awareness service installs various sensor units on the basis of a domain in order to collect personal information. For example, a context awareness system of the related art may be composed of a user device that obtains data from sensors, and a server that extracts context from data obtained by the user device, may analyze the extracted data, and may execute a suitable service for context. Therefore, to support a context awareness service, such a system may require a user device to have various sensors and also may need interaction between a user device and a server. Unfortunately, this may invite difficulty in realizing a cost-effective and well-constructed system.

Additionally, a context awareness service of the related art may require a user to execute a separate program and perform a complicated setting procedure. This may cause poor accessibility for users. Further, a usage scenario of a typical context awareness service may depend on a command defined in a user device. However, since only a user of the user device can know this command, any context associated with external event may not be treated properly.

A headset which is connectible to a user device has also become popular. In a case in which a user listens to audio through a headset, he or she may not easily perceive external sounds. For this reason, a user should take off a headset or directly manipulate a running application.

Therefore, a need exists for a method and device which allows a user device to recognize an external context and to give feedback to a user even while a user wears a headset.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, one aspect of the present disclosure is to provide a method and user device for recognizing a user-defined context through speech recognition, automatically executing a particular action corresponding to the recognized context, and giving feedback to a user.

Another aspect of the present disclosure is to provide a method and user device for recognizing a user-defined context through speech recognition even while a user device is connected to a headset.

Still another aspect of the present disclosure is to provide a method and user device for realizing optimal environments for supporting a context awareness service and thereby enhancing user's convenience and device usability.

In accordance with an aspect of the present disclosure, a method for providing a context awareness service is provided. The method includes defining a control command for the context awareness service depending on a user input, triggering a playback mode and the context awareness service in response to a user selection, receiving external audio through a microphone in the playback mode, determining whether the received audio corresponds to the control command, and executing a particular action assigned to the control command when the received audio corresponds to the control command.

In accordance with another aspect of the present disclosure, a user device is provided. The user device includes a microphone configured to receive external audio, a memory unit configured to store a command table which includes mapping relations from among a user-defined control command, a particular action according to the control command, and context information, a speech recognition unit configured to perform speech recognition to recognize a user context in a context awareness service, and a control unit configured to define the control command for the context awareness service depending on a user input, and to execute the particular action mapped with a specific audio corresponding to the control command when the specific audio is received through the microphone.

In accordance with still another embodiment of the present disclosure, a computer-readable medium is provided. The computer-readable medium records thereon a program configured to define a control command for a context awareness service depending on a user input and to execute a particular action mapped to a specific audio input corresponding to the control command when the specific audio input is received through a microphone.

According to another aspect of the method and user device for providing a context awareness service by using speech recognition of the present disclosure, it is possible for the user device to set various user-defined contexts or rules. In various embodiments of this disclosure, the user device may recognize a user-defined context through a speech recognition process, may automatically execute a particular action assigned to the user-defined context, and may give feedback about context information to a user.

According to another aspect of the present disclosure, even while a user wears the headset connected to the user device, the user device may perform speech recognition with regard to external event in a given condition (e.g., a specific decibel or more). If any user-defined context is recognized, the user device may execute a particular action (e.g., the output of recognized voice, the display of a popup message, the output of vibration, or the like), and may give immediate feedback about context information to a user. Therefore, a user can easily perceive his- or her-defined context without taking off the headset or manipulating a running application.

According to still another aspect of the present disclosure, a user can define various control commands associated with any desired or possible context as well as specific context defined by a manufacturer of the user device. Therefore, a supportable range of a context awareness service may be extended, which may satisfy usability of various users.

According to yet another aspect of the present disclosure, the method and user device disclosed herein may realize optimal environments for supporting a context awareness service and thereby enhancing user's convenience and device usability. Techniques disclosed herein may be simply realized in all kinds of user devices or any other equivalents.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 shows a process of providing a context awareness service using speech recognition according to an embodiment of the present disclosure.

FIG. 8 shows a process of providing a context awareness service using speech recognition according to another embodiment of the present disclosure.

Throughout the drawings, it should be noted that like reference numbers are used to depict the same or similar elements, features, and structures.

DETAILED DESCRIPTION

Figure 1:
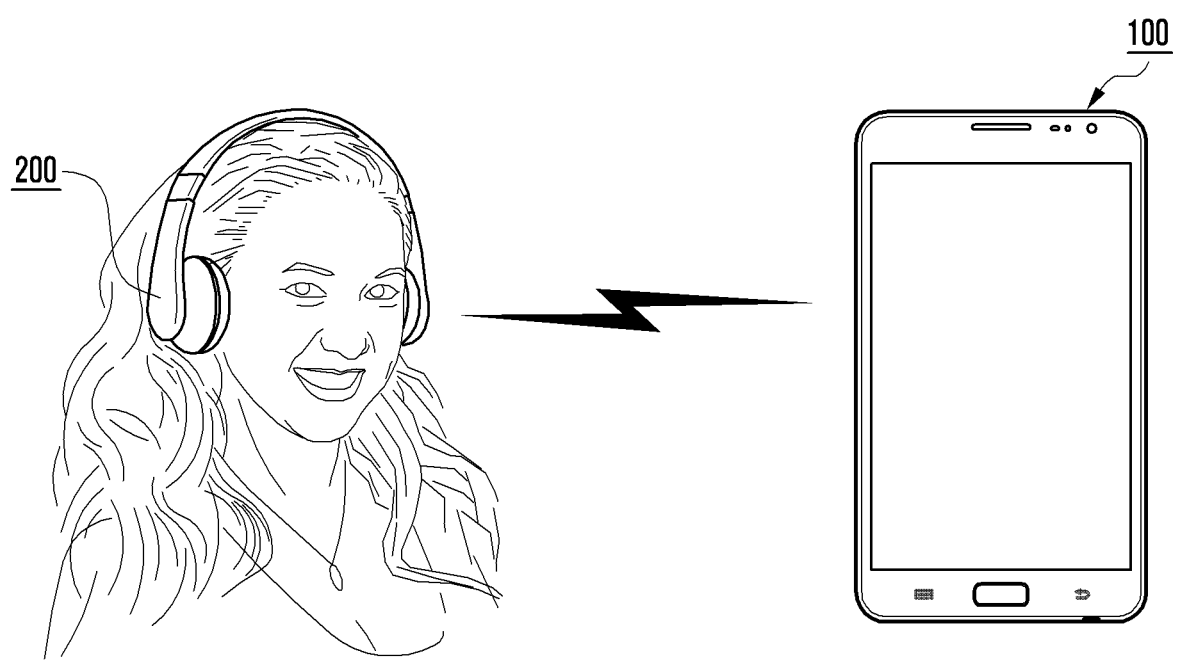
FIG. 1 is a diagram illustrating a context awareness service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method and user device for providing a context awareness service. In various embodiments of this disclosure, the user device may perform context awareness on the basis of a user-defined context (or rule), may automatically execute at least one action assigned to the user-defined context, and may give feedback about context information to a user.

More particularly, in a context awareness service, the user device may perform speech recognition with regard to audio received from any external entity. If speech-recognized audio corresponds to a control command, the user device may execute one or more actions assigned to the control command and also provide context information to a user. According to various embodiments of this disclosure, the user device may recognize a user-defined context (or rule) by using speech recognition, and may provide context information corresponding to the recognized context to a user.

In some embodiments of this disclosure, a user can define various kinds of control commands for context recognition on the basis of a natural language. For example, a user's name, a user's nick name, a user's pet name, any other calling term, any location term, or the like, may be entered in the form of text or voice and may be defined as a control command. While any audio may be outputted in a playback mode through the headset connected to the user device, the user device may record audio received through a microphone and may perform a speech recognition solution. At this time, the user device may compare the gain of the received audio with a reference gain so as to determine whether to perform a speech recognition solution. If a speech recognition solution is performed, the user device may output context information such that a user can easily perceive an automatic task control (e.g., a pause function for media content) and the recognized audio. The output of context information may be provided in a manner of at least one of sight (i.e., screen display), hearing (i.e., sound) and touch (i.e., vibration).

In this disclosure, a context awareness service refers to a service in which the user device recognizes a user-defined contact (or rule) through speech recognition, executes a corresponding particular action, and provides feedback about context information to a user. In this disclosure, an action to be executed in a context awareness service refers to any kind of a control action executed by the user device, including the output of context information through a speaker of the user device, the output of context information through the headset, a separate output of context information through right and left portions of the headset, the display of context information through a display unit, the output of context information by means of vibration, and a control for a current mode (e.g., a pause of playback, the end of playback, or the like). Context information refers to any kind of information to be outputted according to the execution of a particular action, including recognized audio, recognized text, vibration, and any combination thereof.

In this disclosure, depending on a mode (or application) which has been running prior to a context awareness service, one or more actions may be executed. For example, if the user device performs a music playback mode and outputs the sounds of playing music through the headset, any recognized audio may be outputted through the headset. In this case, the music may be paused. If the user device performs a video playback mode and respectively outputs the audio and image of playing video through the headset and a display unit, any recognized text may be displayed on the display unit. In this case, the video may be paused or may continue to play. Additionally, in this case, any recognized audio may be further outputted through the headset, and the video may be paused.

FIG. 1 is a diagram illustrating a context awareness service according to an embodiment of the present disclosure.

Referring to FIG. 1, a context awareness service may be performed using a user device 100 and a headset 200. The user device 100 and the headset 200 may be connected to each other through a wired or wireless interface.

The user device 100 may perform an overall operation associated with a context awareness service. The user device 100 may be any kind of electronic device which employs an Application Processor (AP), a Graphic Processing Unit (GPU), and/or a Central Processing Unit (CPU). For example, the user device 100 may be one of various types of mobile communication terminals, a tablet PC, a smart phone, a digital camera, a Portable Multimedia Player (PMP), a media player, a portable game console, a Personal Digital Assistant (PDA), and the like. Additionally, a function control method disclosed herein may be applied to various types of display devices such as a digital TV, a Digital Signage (DS), a Large Format Display (LFD), and the like.

The headset 200 refers to a device that may be connected to the user device 100, may receive sound from the user device 100, and may output the received sound through a speaker equipped therein.

A user can connect the user device 100 and the headset 200 and then, through the headset 200, listen to the sound of media content (e.g., a music or video file) which plays in the user device 100.

In addition, a user can set a control command for a context awareness service. A control command may be set at any time a user desires. For example, a user may set various control commands, may set a necessary control command when the headset 200 is connected, or may set a desired control command at any time while the user device 100 is used.

A control command may be defined and recognized on the basis of a natural language (i.e., a language used typically by a user). Any command needed for context awareness by a user may be set in various forms based on a natural language. For example, in order to easily perceive that someone is calling a user while he or she listens to music through the headset 200, a user can set, as commands, various natural language terms (e.g., a user's name or nickname) to be used for calling him or her. Additionally or alternatively, in order to easily perceive the arrival of a destination during the use of transportation (e.g., a bus or a subway), a user can set a desired destination (e.g., Seoul station) as a command. Further, a control command may be entered as a voice-based input through a microphone equipped in the user device 100, may be entered as a text-based input through an input unit or display unit equipped in the user device 100, or may be selected by a user from a command list defined in the user device 100.

When a specific control command is recognized through speech recognition in a context awareness service, the user device 100 may control a sound path and a task operation.

Specifically, when a context awareness service is triggered, the user device 100 may activate a speech recognition function. For example, a context awareness service may be triggered when the headset 200 is connected to the user device 100, when any media content starts playing, or when a relevant user input is received. The user device 100 may recognize external audio (e.g., a voice, an announcement, or the like) received through a microphone and compare the recognized audio with user-defined control commands. If it is determined that specific audio corresponding to a selected user-defined control command is received, the user device 100 may consider it as the awareness of user-defined context. Therefore, the user device 100 may execute at least one particular action which corresponds to the recognized context; the action is mapped with the selected control command. The user device 100 may also give feedback about context information to a user.

In one embodiment, a user can set in advance at least one control command based on a natural language term (e.g., a user's name or nickname) to be used for calling him or her and, through the headset 200, may listen to music which is playing in the user device 100. In this case, the user device 100 may execute a speech recognition solution when a selected music file starts playing at a user's request. The speech recognition solution may include an action to activate a microphone to receive external audio and an action to record the received audio. If any specific audio (e.g., a user's name or nickname) corresponding to a user-defined control command is detected from audio received through the microphone while music is playing, the user device 100 may execute a particular action corresponding to the control command and may give feedback about context information to a user. For example, the user device 100 may pause the playback of music or may stop the output of sound to the headset 200 by changing a sound path while maintaining the playback of music. Then the user device 100 may transmit the recognized audio (e.g., a user's name or nickname) to the headset 200 to output the recognized audio through the headset 200. Therefore, a user can understand that the music is stopped because of context awareness, and can also properly cope with a situation where someone calls his or her name.

In an embodiment, if the direction of audio is recognized, this may be reflected in a control command. For example, if someone calls a user's name at a user's right, the user device 100 may give feedback to a user through a right speaker of the headset 200, or may increase a volume of the right speaker so as to raise the user's awareness.

In another embodiment, a user may use a video lecture on the subway. In this case, a user can set a desired destination (e.g., a subway station in Seoul) as a control command for context awareness. Then the user device 100 may trigger a context awareness service and execute a speech recognition solution. If any specific audio (e.g., an announcement of, "The next stop is Seoul station") corresponding to a certain user-defined control command is detected from audio received through the microphone while video is playing, the user device 100 may execute a particular action corresponding to the control command and give feedback about context information to a user. For example, the user device 100 may pause the playback of video, may display a popup window while maintaining the playback of video, or may stop the output of sound to the headset 200 by changing a sound path while maintaining the playback of video. In case of pausing the playback of video or stopping the output of sound, the user device 100 may transmit the recognized audio (e.g., an announcement "The next stop is Seoul station") to the headset 200 to output the recognized audio through the headset 200. In a case of displaying a popup window, the user device 100 may create the popup window corresponding to the recognized audio and may display the pop up window on the playing video. Alternatively, the user device 100 may combine the above actions, namely, the user may not only output the sound but may also display the popup window. A user can perceive that someone calls him or her even while using the user device 100.

As discussed herein, the user device 100 may be aware of external context and may give feedback to a user, thus enhancing a user's convenience. For example, by stopping a sound output of the headset 200, the user device 100 may allow a user to have no need to take off the headset 200. In addition, by recognizing user circumstances, the user device 100 may give immediate feedback about context information to a user in various ways, such as a sound output control, a display control, a progress control, or the like.

Meanwhile, in an embodiment shown in FIG. 1, the user device 100 is connected to the headset 200 through a wired or wireless interface and outputs a sound to the headset 200. This is, however, exemplary only and not to be considered as a limitation of the present disclosure. Alternatively, even though the headset 200 is not connected, the user device 100 may trigger a context awareness service, may recognize user-defined context through speech recognition, and may give feedback about context information to a user.

Now, a configuration and operation of the user device 100 will be described with reference to drawings. The following description is provided as an embodiment and not be considered as a limitation of this disclosure.

Figure 2:
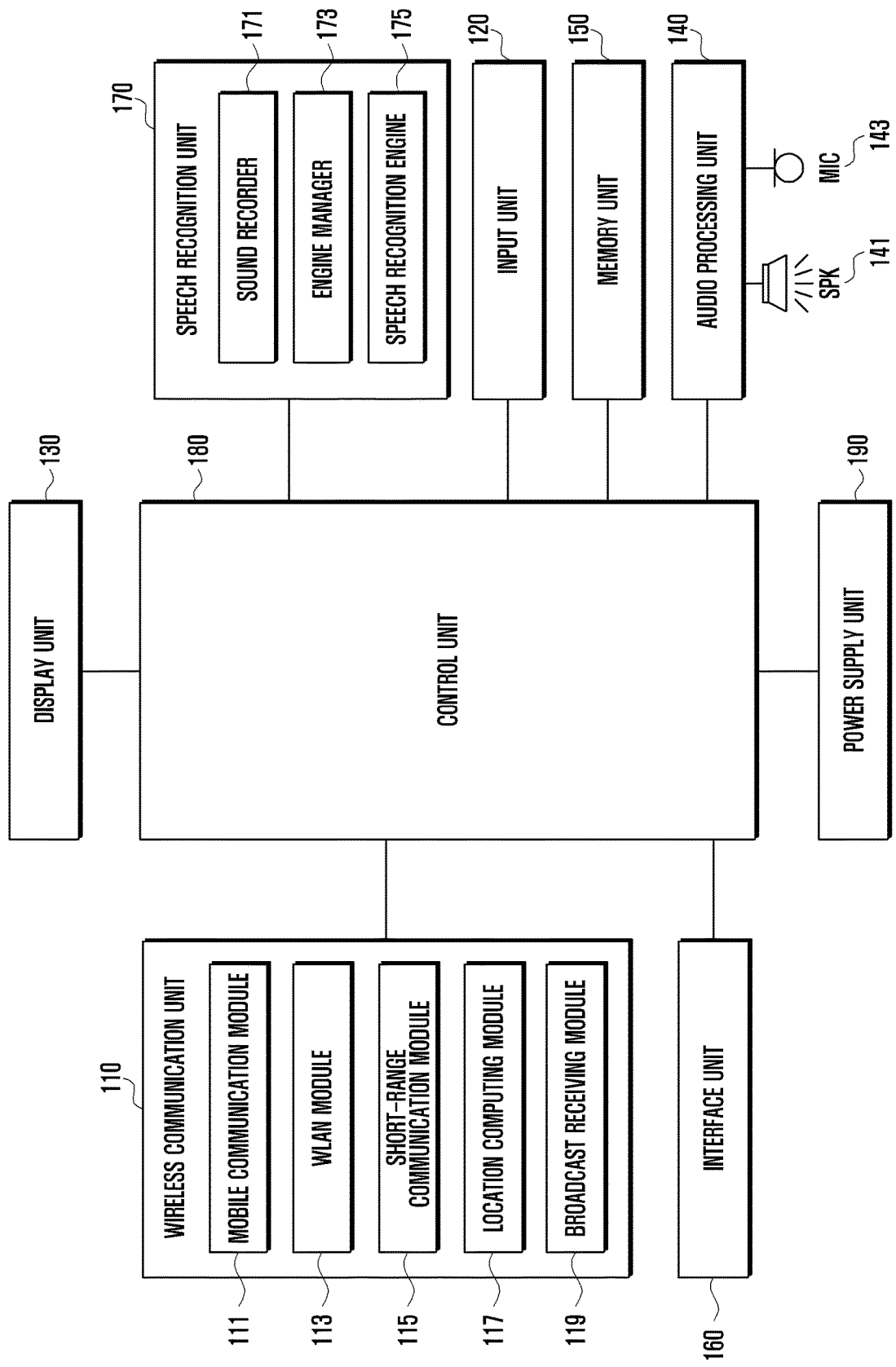
FIG. 2 is a block diagram illustrating a configuration of a user device according to an embodiment of the present disclosure.

FIG. 2 is a block diagram illustrating a configuration of a user device according to an embodiment of the present disclosure.

Referring to FIG. 2, the user device 100 may include a wireless communication unit 110, an input unit 120, a display unit 130, an audio processing unit 140, a memory unit 150, an interface unit 160, a speech recognition unit 170, a control unit 180, and a power supply unit 190. These elements of the user device 100 may be not always essential. Alternatively, more or less elements may be included in the user device 100. For example, the user device 100 may further include a camera module (not shown) to support an image capture function.

The wireless communication unit 110 may have one or more modules capable of performing a wireless communication between the user device 100 and a wireless communication system or between the user device 100 and other user device. For example, the wireless communication unit 110 may have at least one of a mobile communication module 111, a Wireless Local Area Network (WLAN) module 113, a short-range communication module 115, a location computing module 117, and a broadcast receiving module 119.

The mobile communication module 111 may transmit or receive a wireless signal to or from at least one of a base station, an external device, and a server in a mobile communication network. A wireless signal may include a voice call signal, a video call signal, and text/multimedia message data. The mobile communication module 111 may perform access to an operator server or a contents server under the control of the control unit 180 and then download a command table in which various control commands and actions are mapped with each other for a context awareness service.

The WLAN module 113 refers to a module for performing a wireless internet access and establishing a wireless LAN link with other user device. The WLAN module 113 may be embedded in or attached to the user device 100. For a wireless internet access, well-known technique such as Wi-Fi, Wireless Broadband (Wibro), World Interoperability for Microwave Access (Wimax), or High Speed Downlink Packet Access (HSDPA) may be used. The WLAN module 113 may perform access to an operator server or a contents server under the control of the control unit 180 and then download a command table in which various control commands and actions are mapped with each other for a context awareness service. Also, when a wireless LAN link is formed with any other user device, the WLAN module 113 may transmit to or receive from other user device a command table in which user-selected control commands and actions are mapped with each other. And also, the WLAN module 113 may transmit or receive a command table to or from a cloud server through a wireless LAN.

The short-range communication module 115 refers to a module designed for a short-range communication. As short-range communication technique, Bluetooth, Radio Frequency Identification (RFID), Infrared Data Association (IrDA), Ultra Wideband (UWB), ZigBee, Near Field Communication (NFC), and the like may be used. When a short-range communication is connected to any other user device, the short-range communication module 115 may transmit or receive a command table to or from other user device. More particularly, the short-range communication module 115 may be connected to the headset 200 under the control of the control unit 180 and then transmit or receive a wireless signal to or from the headset 200. Such a wireless signal may include a sound signal and a control command.

The location computing module 117 refers to a module for obtaining the location of the user device 100, for example, a Global Positioning System (GPS) module. The location computing module 117 may calculate information about time and distance from at least three base stations and then, based on such information, calculate a current location (if necessary, a three-dimensional location including latitude, longitude and altitude) through triangulation. Alternatively, the location computing module 117 may calculate a real-time location of the user device 100 by receiving real-time data from at least three satellites. Any other technique to obtain the location of the user device 100 may be used.

The broadcast receiving module 119 may receive a broadcast signal (e.g., a TV broadcast signal, a radio broadcast signal, a data broadcast signal, or the like) and/or broadcast-related information (e.g., information about a broadcast channel, a broadcast program, a broadcast service provider, or the like) from any external broadcast management server through a broadcast channel (e.g., a satellite channel, a terrestrial channel, or the like).

The input unit 120 may receive user's manipulation and create input data for controlling the operation of the user device 100. The input unit 120 may be selectively composed of a keypad, a dome switch, a touchpad, a jog wheel, a jog switch, and the like. The input unit 120 may be formed of buttons installed at the external side of the user device 100, some of which may be realized in a touch panel. The input unit 120 may create input data when a user's input for setting a control command or triggering a context awareness service is received.

The display unit 130 may display information processed in the user device 100. For example, when the user device 100 is in a call mode, the display unit 130 may display a screen interface such as a User Interface (UI) or a Graphic User Interface (GUI) in connection with a call mode. When the user device 100 is in a video call mode or a camera mode, the display unit 130 may display a received and/or captured image, UI or GUI. More particularly, the display unit 130 may display various UIs and/or GUIs associated with a context awareness service. For example, the display unit 130 may display a control command setting screen, a context information feedback screen, or the like. Examples of such screens or interfaces will be described later.

The display unit 130 may include a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, or a Three Dimensional (3D) display. Parts of such displays may be realized as transparent display.

If a touch screen in which the display unit 130 and a touch panel (not shown) are formed of a layered structure is employed, the touch panel may be used as the input unit. The touch panel may be configured to detect a pressure or a variation in capacitance from a surface thereof or of the display unit 130 and to convert into an electric input signal. In an embodiment, the touch panel may detect a touch location, an area and a pressure. If there is any touch input on the touch panel, a corresponding signal may be transferred to a touch controller (not shown). The touch controller may process a received signal and may send corresponding data to the control unit 180. Therefore, the control unit 180 may recognize which spot is touched.

The audio processing unit 140 may transmit to a speaker 141 an audio signal received from the control unit 180, and also transmit to the control unit 180 an audio signal such as voice received from a microphone 143. Under the control of the control unit 180, the audio processing unit 140 may convert an audio signal into an audible sound and output it to the speaker 141, and may also convert an audio signal received from the microphone 143 into a digital signal and output it to the control unit 180.

The speaker 141 may output audio data received from the wireless communication unit 110, audio data received from the microphone 143, or audio data stored in the memory unit 150 in a call mode, a recording mode, a speech recognition mode, a broadcast receiving mode, a camera mode, a context awareness service mode, or the like. The speaker 141 may output a sound signal associated with a particular function (e.g., the feedback of context information, the arrival of an incoming call, the capture of an image, the playback of media content such as music or video) performed in the user device 100.

The microphone 143 may process a received sound signal into electric voice data in a call mode, a recording mode, a speech recognition mode, a camera mode, a context awareness service mode, or the like. In a call mode, the processed voice data may be converted into a suitable form for transmittance to a base station through the mobile communication module 111. In a context awareness service mode, the processed voice data may be converted into a suitable form for process in the control unit 180 through the speech recognition unit 170. The microphone 143 may have various noise removal algorithms for removing noise from a received sound signal. When a user's input for triggering a context awareness service or setting a control command is received, the microphone 143 may create relevant input data and deliver it to the control unit 180.

The memory unit 150 may store a program associated with processing and controlling operations of the control unit 180 and temporarily store data (e.g., a control command, an action, a phone number, a message, an audio, a video, or the like) inputted or to be outputted. The memory unit 150 may also store the frequency of using a particular function (e.g., the frequency of using a control command, an application, a phone number, a message, a multimedia, or the like), the priority of a particular function, and the like. Further, the memory unit 150 may store vibration and sound data having specific patterns and to be outputted in response to a touch input on the touch screen. More particularly, the memory unit 150 may store a command table that contains mapping relations from among a user-defined control command, a defined (e.g., user-defined) action (or function) according to a control command, context information according to a control command, an action execution rule according to an application, and the like.

Additionally, the memory unit 150 may buffer audio received through the microphone 143 in a context awareness service and store buffered audio as recorded data under the control of the control unit 180. In a case in which the speech recognition unit 170 is formed of software, the memory unit 150 may store such software.

The memory unit 150 may include at least one storage medium, such as flash memory, hard disk, micro-type memory, card-type memory, Random Access Memory (RAM), Static RAM (SRAM), Read Only Memory (ROM), Programmable ROM (PROM), Electrically Erasable PROM (EEPROM), Magnetic RAM (MRAM), magnetic disk, optical disk, or the like. The user device 100 may interact with any kind of web storage that performs a storing function of the memory unit 150 on the Internet.

The interface unit 160 may act as a gateway to and from all external devices connected to the user device 100. The interface unit 160 may receive data from any external device (e.g., the headset 200) or may transmit data of the user device 100 to such an external device. Also, the interface unit 160 may receive electric power from any external device (e.g., a power supply device) and may distribute it to respective elements in the user device 100. The interface unit 160 may include, for example, but is not limited to the inclusion of, a wired/wireless headset port, a charger port, a wired/wireless data port, a memory card port, an audio input/output port, a video input/output port, a port for connecting any device having an identification module, or the like.

The speech recognition unit 170 may perform a speech recognition operation to execute various functions of the user device 100 by using speech recognition and to be aware of user context in a context awareness service. The speech recognition unit 170 may include a sound recorder 171, an engine manager 173, and a speech recognition engine 175.

The sound recorder 171 may record audio (e.g., a voice, an announcement, or the like) received from the microphone 143 to create recorded data.

The engine manager 173 may transfer recorded data received from the sound recorder 171 to the speech recognition engine 175 and may transfer recognition results received from the speech recognition engine 175 to the control unit 180. When any recognition result analyzed as a control command is received from the speech recognition engine 175, the engine manager 173 may create a relevant control command and transfer it to the control unit 180.

The speech recognition engine 175 may analyze recorded data received from the engine manager 173. In an embodiment, the speech recognition engine 175 may determine whether recorded data contains a defined control command. If recorded data contains any defined control command, the speech recognition engine 175 may transfer analysis results to the engine manager 173. In an embodiment, the speech recognition engine 175 used for converting an input signal into text or voice may include a text-to-speech engine for converting text into voice and a speech-to-text engine for converting voice into text.

In an embodiment, the speech recognition unit 170 may be formed of software, based on an Operating System (OS), to perform an operation associated with various services using voice. The speech recognition unit 170 formed of software may be stored or loaded in the memory unit 150, in the control unit 180, or in a separate processor (not shown).

The control unit 180 may control the overall operation of the user device 100. For example, the control unit 180 may perform a control process associated with a voice call, a data communication, or a video call. More particularly, the control unit 180 may control the overall operation associated with a context awareness service using speech recognition. In an embodiment, the control unit 180 may control a process of setting a user-defined control command, a process of performing context awareness corresponding to a control command through speech recognition, a process of executing a defined (e.g., user-defined) action, and a process of giving feedback about context information.

The control unit 180 may define a control command for a context awareness service, depending on a user's input, and may store it in the memory unit 150. If any audio corresponding to a control command is received through the microphone 143 in a context awareness service, the control unit 180 may execute a particular action corresponding to the received audio. Additionally, the control unit 180 may control the output of context information corresponding to the executed action. In an embodiment, the control unit 180 may analyze the gain of received audio and compare the gain of audio with a reference gain. If the gain of audio is greater than a reference gain, the control unit 180 may perform speech recognition with regard to the received audio. Additionally, the control unit 180 may control, based on a particular action, a current play mode which is running when any audio corresponding to a control command is received, and control the output of context information in a manner of at least one of sight, hearing and touch. After the output of context information, the control unit 180 may continue to control a current play mode.

The control unit 180 will be more fully described later with reference to drawings.

The power supply unit 190 may supply electric power required for the operation of the user device 100 under the control of the control unit 180.

Various embodiments disclosed herein may be realized using software, hardware, and a combination thereof, in any kind of computer-readable recording medium. In case of hardware, various embodiments disclosed herein may be realized using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and any other equivalent electronic unit. In any case, various embodiments disclosed herein may be realized in the control unit 180 alone. In case of software, various embodiments disclosed herein may be realized using separate software modules each of which can perform at least one of functions discussed herein.

In an embodiment, a computer-readable recording medium may record a specific program that defines a control command for a context awareness service in response to a user's input, may execute a particular action when any audio corresponding to a control command is received through the microphone, and may process the output of context information corresponding to the executed action.

Figure 3:
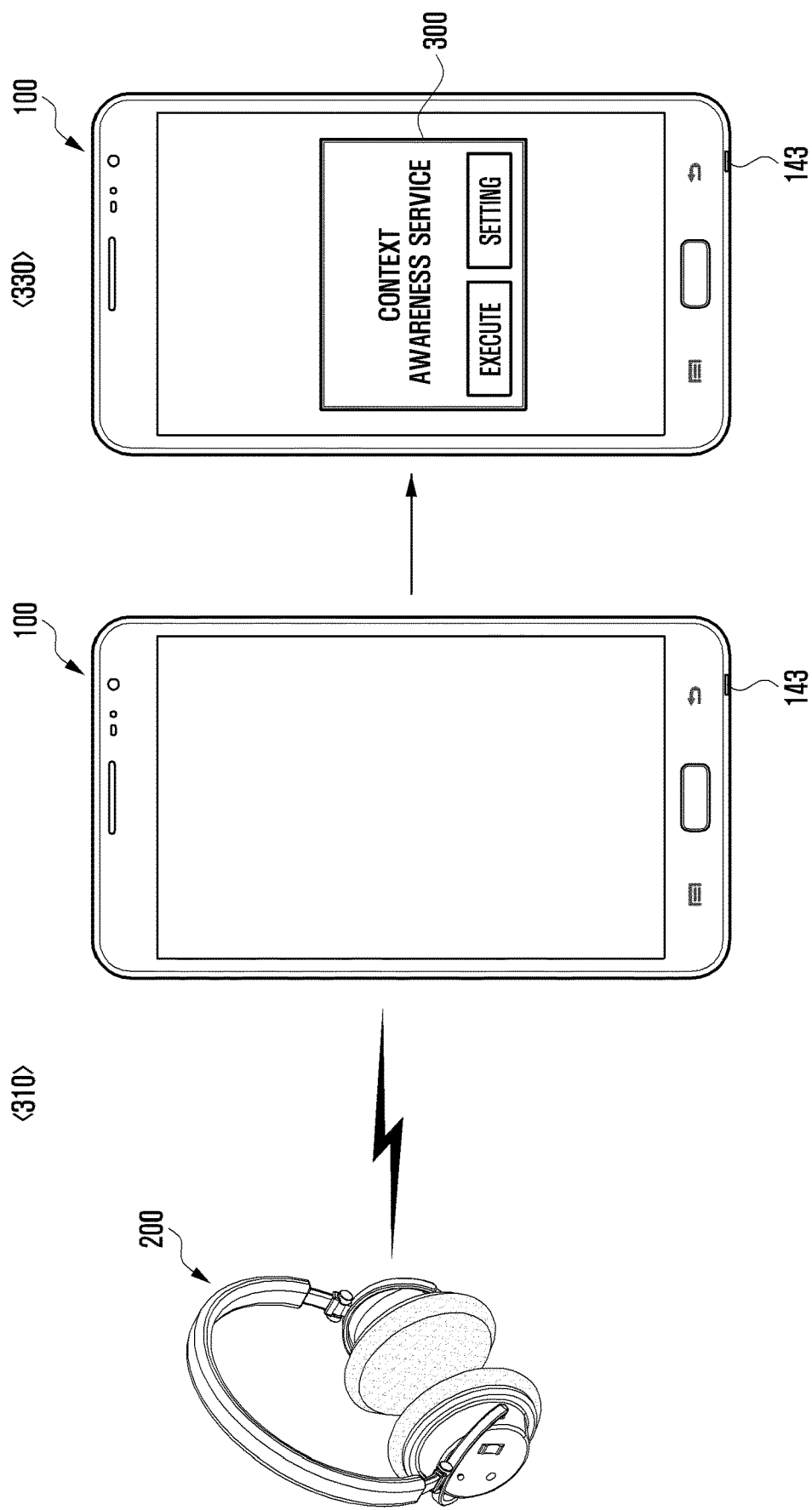
FIG. 3 is a diagram illustrating an execution of a context awareness service in a user device according to an embodiment of the present disclosure.

FIG. 3 is a diagram illustrating an execution of a context awareness service in a user device according to an embodiment of the present disclosure.

Referring to FIG. 3, as indicated by a reference number 310, a user may connect the user device 100 and the headset 200. For example, a user who desires to listen to audio, through the headset 200, of media content which is playing in the user device 100 may connect the user device 100 and the headset 200 through a wireless interface (e.g., Bluetooth) or a wired interface (e.g., a connector).

Once the headset 200 is connected to the user device 100 in any mode (e.g., an idle mode, a media content play mode, or the like), the user device 100 may change an audio output path to the headset 200. As indicated by a reference number 330, the user device 100 may offer on the screen a popup window 300 associated with a context awareness service. This popup window 300 may be optionally provided, depending on user's setting. If the popup window 300 is set to be provided, the popup window 300 may be automatically displayed when the headset 200 is connected to the user device 100. If the popup window 300 is set to be not provided, namely in case of an automatic execution type, a context awareness service may be automatically and internally executed when the headset 200 is connected to the user device 100.

When the popup window 300 is displayed on the screen, a user can select an execute button in the popup window 300 such that a context awareness service may be executed immediately. In response to a user's selection, the user device 100 may remove the popup window 300 from the screen and may trigger a specific task of a context awareness service. For example, the user device 100 may turn on the microphone 143 to receive external audio and perform speech recognition with regard to the received audio.

Figure 4:
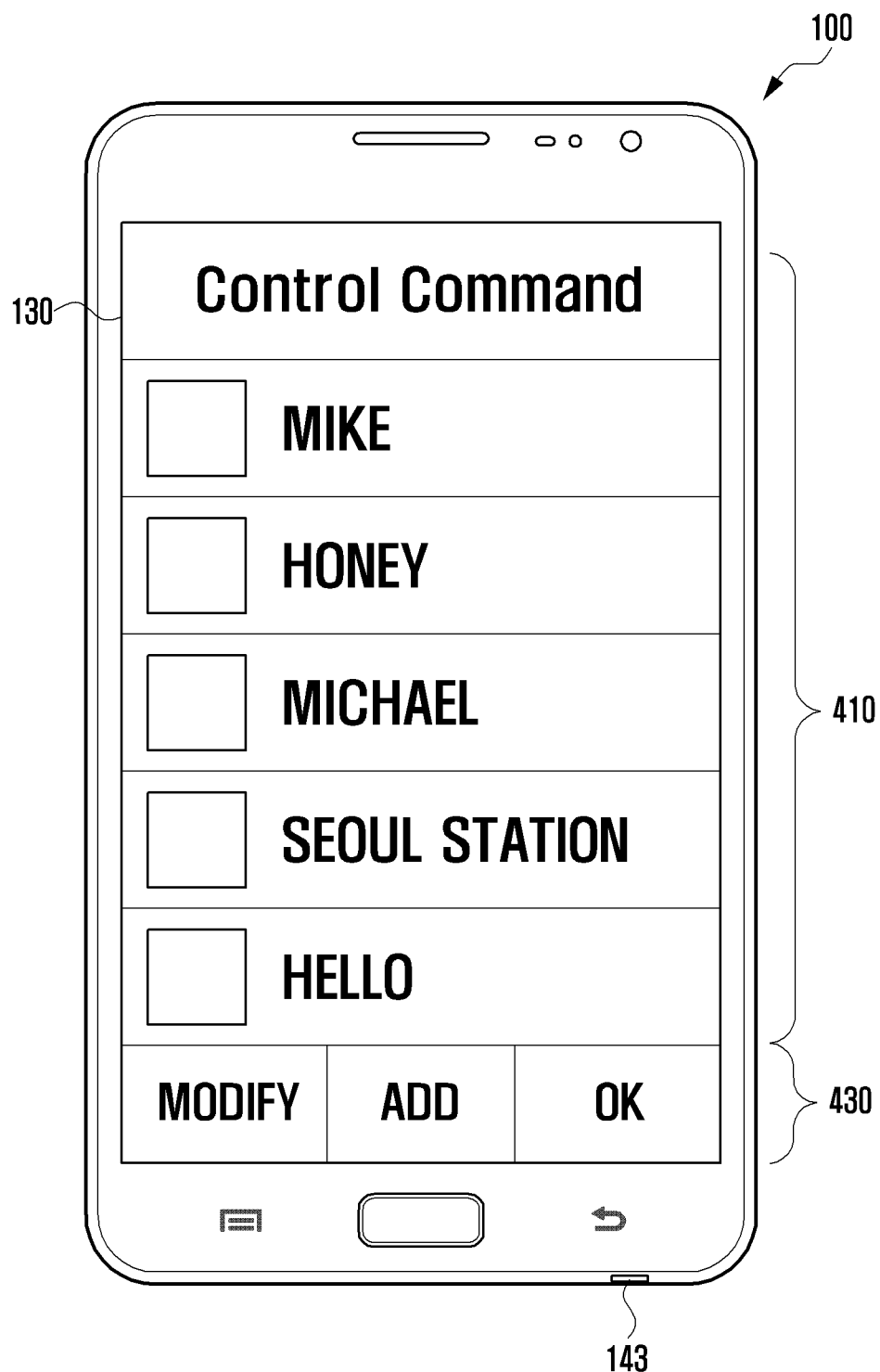
FIG. 4 is a screenshot illustrating a list of control commands displayed on a user device according to an embodiment of the present disclosure.

A user can select a setting button in the popup window 300 so as to set a control command for context awareness. A related screenshot is shown in FIG. 4. In an embodiment, once a setting button is selected from the popup window 300, the user device 100 may provide a screen interface to be used for setting a control command. The screen of the user device 100 as indicated by a reference number 330 may be switched to the screen as shown in FIG. 3.

FIG. 4 is a screenshot illustrating a list of control commands displayed on a user device according to an embodiment of the present disclosure.

Referring to FIG. 4, a screen interface for a control command may include a command region 410 which arranges control commands registered by a user, and a menu region 430 which arranges menu items for modifying, adding or setting a control command. In an embodiment, a control command may be entered as a voice-based input through the microphone 143, or entered as a text-based input through the input unit 120 (not shown) or the display unit 130. Such voice and text for a control command may be entered in the form of a natural language, for example, a user's name such as "Michael" or "William," a user's nickname such as "Mike" or "Bill," a user's pet name such as "Honey" or "Sweetie," another calling term such as "Hey," "Hello," or "Friend," and any location term such as "Seoul," "Seoul Station," "City Hall," or "The next stop is Seoul station," which may be in the form of a word, a phrase or a sentence.

A user who desires to use immediately a context awareness service may select at least one control command in the command region 410 of the screen interface and then select an OK button in the menu region 430. A user who desires to modify any existing control command may select at least one control command in the command region 410 of the screen interface and then select a modify button in the menu region 430. A user who desires to further register a new control command may select an add button in the menu region 430 of the screen interface and then enter a new control command on the basis of text or voice.

Although the screen interface shown in FIG. 4 may be provided according to the procedures shown in FIG. 3, this is exemplary only and is not to be considered as a limitation. Alternatively or additionally, the screen interface shown in FIG. 4 may be called at any time in response to a user's manipulation.

If at least one control command is set through the screen interface, the user device 100 may trigger a context awareness service and turn on the microphone 143 to receive external audio and perform speech recognition with regard to the received audio.

FIG. 3 shows that when the headset 200 is connected to the user device 100, the popup window 300 for a context awareness service is provided or a context awareness service is automatically executed. This is, however, exemplary only and is not to be considered as a limitation. Alternatively, a context awareness service may be executed in response to a user's menu manipulation regardless of whether the headset 200 is connected. Additionally, a context awareness service may be executed when any media content (e.g., music, video, or the like) starts to play. A context awareness service may also be executed in response to a user-defined specific context, for example, a user-defined specific location (e.g., a home, an office, a school, or the like).

Figure 5:
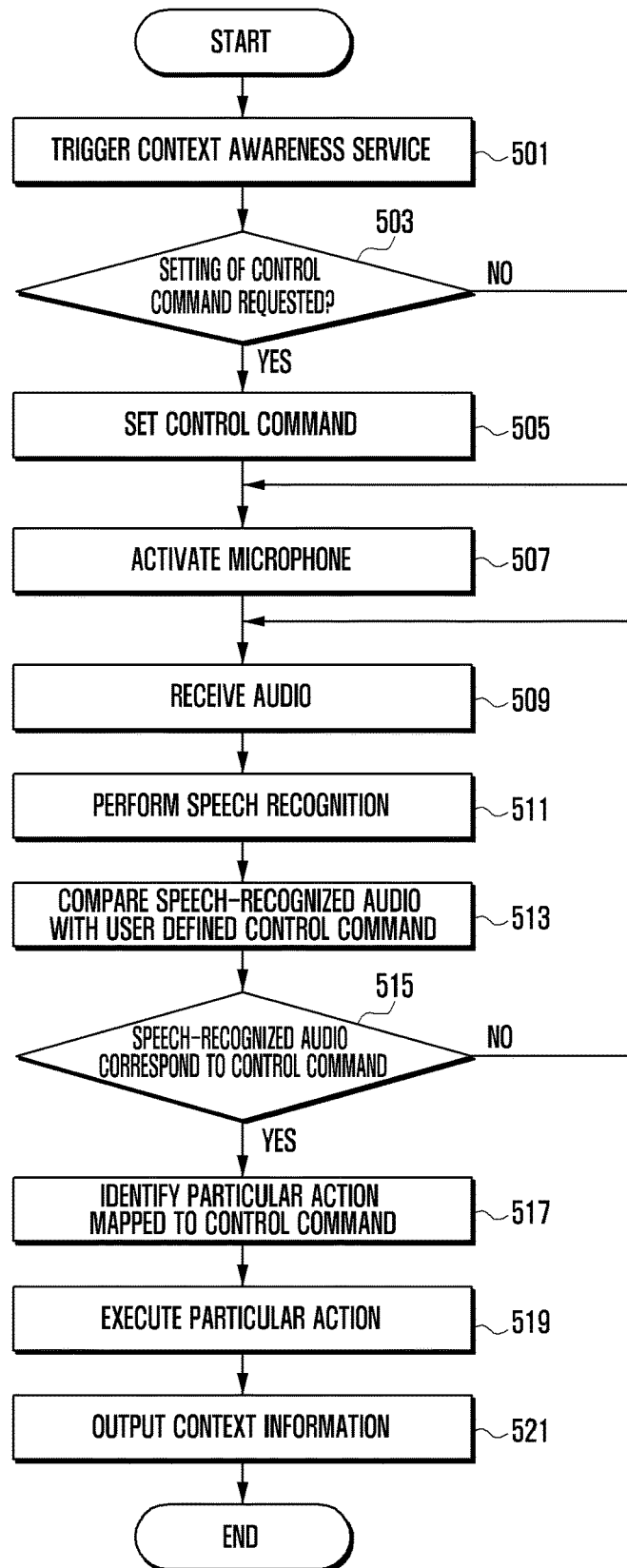
FIG. 5 is a flow diagram illustrating a method for providing a context awareness service using speech recognition according to an embodiment of the present disclosure.

FIG. 5 is a flow diagram illustrating a method for providing a context awareness service using speech recognition according to an embodiment of the present disclosure.

Referring to FIG. 5, at operation 501, the control unit 180 may trigger a context awareness service. In an embodiment, a context awareness service may be executed in response to a user's menu manipulation, when the headset 200 is connected to the user device 100, or when a user-defined specific context is detected.

At operation 503, the control unit 180 may determine whether there is a request for setting a control command. If there is a request for setting a control command, the control unit 180 may set a control command in response to a user's input at operation 505. For example, as shown in FIG. 4, the control unit 180 may provide a screen interface for setting a control command and, depending on a user's input through the screen interface, may add a new control command based on text or voice or select at least one of preregistered control commands. Further, the control unit 180 may set the added or selected control command as a control command for a context awareness service.

If there is no request for setting a control command or when a process of setting a control command is completed, the control unit 180 may activate the microphone 143 at operation 507. In an embodiment, if the microphone 143 is turned off, the control unit 180 may turn on the microphone 143 and wait for the microphone 143 to receive external audio. Therefore, if the microphone 143 has been already turned on, operation 507 may be skipped.

When audio is received through the microphone 143 at operation 509, the control unit 180 may perform speech recognition with regard to the received audio at operation 511.

The control unit 180 may compare the speech-recognized audio with a user-defined control command at operation 513, and may determine at operation 515 whether the speech-recognized audio corresponds to a specific user-defined control command. At operation 515, the control unit 180 may determine whether the speech-recognized audio agrees with a specific control command (or contains any control command). For example, in case a user-defined control command is "Seoul station," the control unit 180 may determine whether the speech-recognized audio is "Seoul station" or is a phrase (e.g., "The next stop is Seoul station") containing "Seoul station." At operation 513, the comparison of the speech-recognized audio and a user-defined control command may be performed with regard to text converted from the speech-recognized audio.

If the speech-recognized audio fails to correspond to any control command at operation 515, the control unit 180 may return to operation 509. If the speech-recognized audio corresponds to a specific control command at operation 515, the control unit 180 may identify a particular action mapped to the specific control command at operation 517.

In an embodiment, the control unit 180 may execute the identified particular action at operation 519 and may output context information associated with the execution of the action at operation 521. For example, let's suppose that a user-defined control command is "Seoul station," and that a particular action mapped with the control command is to pause the playback of media content and to output a recognized audio (e.g., "The next stop is Seoul station"). Then the control unit 180 may pause the playback of media content and output a recognized audio (e.g., "The next stop is Seoul station") through the speaker 141 or through the headset 200 if the headset 200 is connected. Alternatively, if a particular action mapped with the control command is to maintain the playback of media content and to display a recognized audio on the screen, the control unit 180 may control the display unit 130 to display a recognized audio (e.g., "The next stop is Seoul station") in an overlay form on the screen of media content while maintaining the playback of media content.

Figure 6:
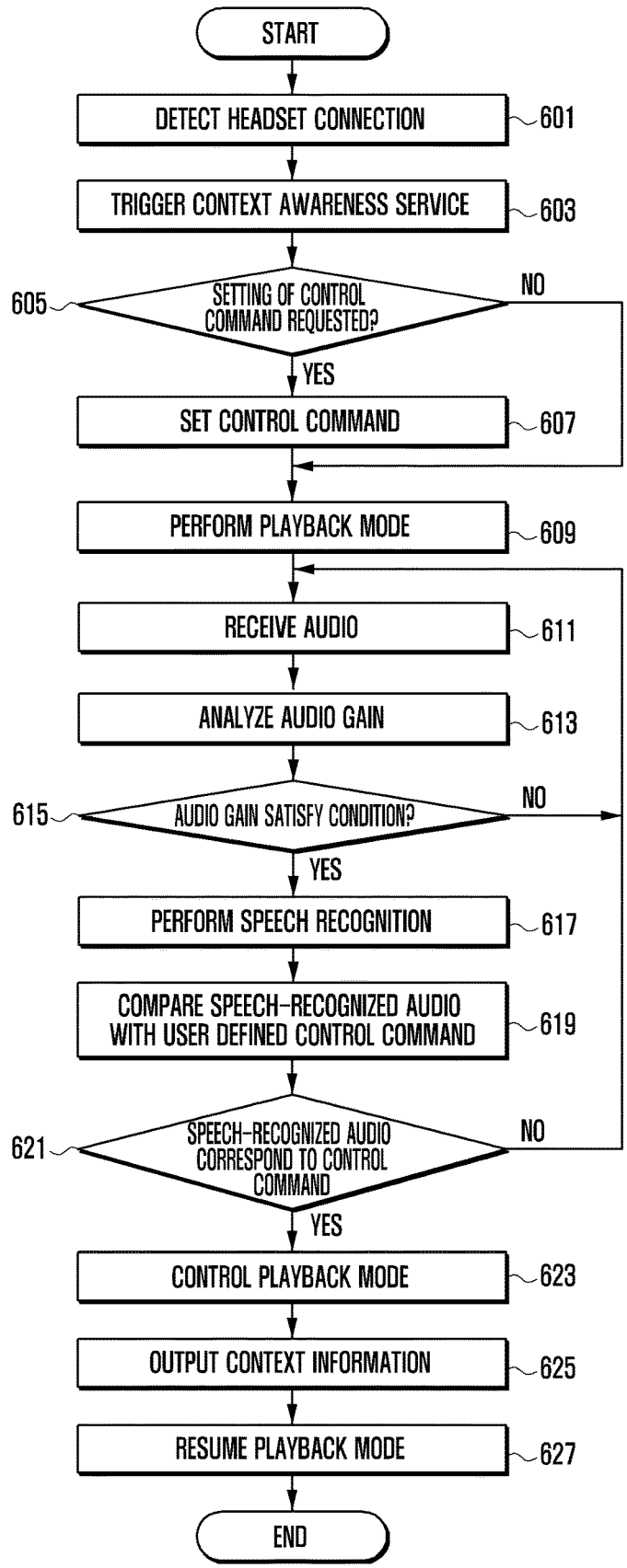
FIG. 6 is a flow diagram illustrating a method for providing a context awareness service using speech recognition according to another embodiment of the present disclosure.

FIG. 6 is a flow diagram illustrating a method for providing a context awareness service using speech recognition according to another embodiment of the present disclosure.

Referring to FIG. 6, when the connection of the headset 200 is detected at operation 601, the control unit 180 may trigger a context awareness service at operation 603. At this time, the control unit 180 may check the state of the microphone 143 and, if the microphone 143 is turned off, may turn on the microphone 143 to receive external audio.

At operation 605, the control unit 180 may determine whether there is a user's request for setting a control command. For example, the control unit 180 may offer the popup window 300 as shown in FIG. 3 and may determine whether any user input for setting a control command is received through the popup window 300.

If there is a request for setting a control command, the control unit 180 may set a control command in response to a user's input at operation 607 and then proceed to operation 609. If there is no request for setting a control command, the control unit 180 may directly proceed to operation 609.

At operation 609, the control unit 180 may perform a playback mode in response to a user's request. For example, the control unit 180 may play media content (e.g., a music file, a video file, or the like) requested by a user, or receive and play a broadcast program of a channel selected by a user. Alternatively, the control unit 180 may execute a game function requested by a user, or may execute an image capture function. In an embodiment, in a playback mode, the user device 100 may perform any type of executable function.

When audio is received through the microphone 143 at operation 611, the control unit 180 may analyze the gain of the received audio at operation 613. At operation 615, the control unit 180 may determine whether the analyzed audio gain satisfies a given condition (e.g., a reference gain). For example, the control unit 180 may analyze the gain of the received audio and then determine whether the audio gain is greater than a reference gain. In an embodiment, a reference gain may be a specific value (i.e., a specific decibel value) defined by a user or an average value (i.e., an average decibel value) of audio inputs received through the microphone 143. In the latter case, the control unit 180 may obtain the gain of audio inputs received through the microphone 143 and then calculate an average value. This operation may be required so as not to perform an unnecessary speech recognition process with regard to unintended noise.

If the analyzed audio gain fails to satisfy a given condition at operation 615 (e.g., when the analyzed audio gain is not greater than a reference gain), the control unit 180 may return to operation 611. If the analyzed audio gain satisfies a given condition at operation 615 (e.g., when the analyzed audio gain is greater than a reference gain), the control unit 180 may perform speech recognition at operation 617.

The control unit 180 may compare the speech-recognized audio with a user-defined control command at operation 619, and may determine at operation 621 whether the speech-recognized audio corresponds to a specific user-defined control command. At this time, the control unit 180 may determine whether the speech-recognized audio agrees with a specific control command or contains any control command as discussed above.

If the speech-recognized audio fails to correspond to any control command at operation 621, the control unit 180 may return to operation 611.

If the speech-recognized audio corresponds to a specific control command at operation 621, the control unit 180 may control a playback mode at operation 623. For example, the control unit 180 may pause a playback mode, adjust an output volume of the headset 200 (e.g., a mute output), or perform a mute output of audio with a playback mode maintained. The control unit 180 may output context information mapped with a control command at operation 625. For example, the control unit 180 may provide feedback to a user by outputting context information through a popup display, an audio output, or the like.

After the output of context information, the control unit 180 may resume a playback mode at operation 627. For example, the control unit 180 may release the paused playback mode and then resume playing, may readjust an output volume to a previous volume, or may restore an output volume of currently playing audio.

FIG. 7 shows a process of providing a context awareness service using speech recognition according to an embodiment of the present disclosure.

Referring to FIG. 7, at operation 710, a user may set in advance a control command for a context awareness service or may set at a desired time to trigger a context awareness service. For example, the user device 100 may set "Michael" as a user-defined control command. At operation 720, a user may connect the headset 200 to the user device 100 and also play a selected music file in the user device 100. At operation 730, the user device 100 may output the audio of the selected music file through the headset 200 and may perform a speech recognition solution (including a voice recording).

If external audio (e.g., a voice indicating, "Michael blah-blah-blah") for calling a user is received through the microphone 143, the user device 100 may recognize the received audio as a control command through speech recognition at operation 740 and may pause the playback of a music file at operation 750. Further, at operation 760, the user device 100 may output the recognized audio (or a control command) through the headset 200 to give feedback to a user. In an embodiment, by outputting the recognized audio through the headset 200, the user device 100 may allow a user to understand that the music is stopped because of a defined context.

Additionally, if the direction of audio is recognized, the user device 100 may reflect it in the recognized audio (or a control command) to be outputted through the headset 200. For example, if someone calls a user and states, e.g., "Michael blah-blah-blah" from the user's right, the user device 100 may output the recognized audio (or a control command) through a right speaker of the headset 200 or may increase a relative volume of the right speaker so as to raise the user's awareness.

FIG. 8 shows a process of providing a context awareness service using speech recognition according to another embodiment of the present disclosure.

Referring to FIG. 8, at operation 810, a user who watches or listens to a video lecture may take a subway train at a city hall station. Then, at operation 820, a user may set a desired destination (e.g., Seoul station) as a control command for a context awareness service and may trigger a context awareness service. A control command may be set through a voice or text input. At operation 820, a user may still watch or listen to a video lecture.

At operation 830, the user device 100 may perform a context awareness service while controlling the playback of a video lecture. In this state, a certain announcement (e.g., "The next stop is Seoul station") corresponding to the defined control command (e.g., Seoul station) may be received. Then, at operation 840, the user device 100 may recognize the control command (e.g., Seoul station) from an announcement. Additionally, at operation 850, the user device 100 may record the recognized audio and may output the recognized audio on a playing video. For example, an announcement (e.g., "The next stop is Seoul station") may be displayed as context information in an overlay form on the screen of a currently playing video.

The above-discussed embodiments of the present disclosure can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to software or a hardware structural element such as a Field Programmable Gate Array (FPGA) or an Application Specific Integrated Circuit (ASIC), and the "unit" performs some roles. However, the "unit" is not always limited to software or hardware. The "unit" can be configured to be stored in an addressable storage medium and to play at least one processor. Accordingly, for example, the "unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "units" may be engaged by the smaller number of structural elements and "units", or may be divided by additional structural elements and "units". Furthermore, structural elements and "units" may be implemented to play a device or at least one CPU in a security multimedia card.

While this disclosure has been particularly shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus comprising:
   a touchscreen display;
   communication circuitry;
   a memory to store a specified command; and
   at least one processor configured to:
      establish, using the communication circuitry, a wireless communication connection between the apparatus and a wireless earphone including a speaker,
      reproduce multimedia data, the reproducing including transmitting audio data corresponding to at least part of the multimedia data to the wireless earphone via the wireless communication connection such that the audio data is output via the speaker included in the wireless earphone,
      obtain a sound input from an outside of the apparatus while the multimedia data is reproduced at the apparatus,
      determine that the sound input received from the outside of the apparatus corresponds to the specified command stored in the memory,
      pause the reproducing of the multimedia data based at least in part on the determining that the sound input corresponds to the specified command,
      transmit an audio indicator corresponding to the specified command to the wireless earphone via the wireless communication connection based at least in part on the pausing of the reproducing of the multimedia data, and
      display a visual indicator corresponding to the sound input via the touchscreen display based at least in part on the determining that the sound input corresponds to the specified command,
   wherein the audio indicator is output via the speaker.

2. The apparatus of claim 1, wherein the at least one processor is further configured to:
   perform the specified command based at least in part on the determining that the sound input received from the outside of the apparatus corresponds to the specified command stored in the memory.

3. The apparatus of claim 1, wherein the at least one processor is further configured to:
   obtain the sound input and determine that the sound input corresponds to the specified command based at least in part on receiving a touch input to the apparatus.

4. The apparatus of claim 3, wherein the at least one processor is further configured to:
   perform the specified command based at least in part on receiving the touch input to the apparatus.

5. The apparatus of claim 1, wherein the at least one processor is further configured to:
   obtain a plurality of sound inputs from the outside of the apparatus while the multimedia data is reproduced at the apparatus,
   determine that each of the plurality of the sound inputs received from the outside of the apparatus corresponds to respective specified commands stored in the memory, and
   perform at least one of the respective specified commands.

6. The apparatus of claim 1, wherein each specified command stored in the memory has a plurality of corresponding sound inputs and a corresponding audio indicator.

7. A method comprising:
establishing, using communication circuitry, a wireless communication connection between an apparatus and a wireless earphone including a speaker;
reproducing multimedia data, the reproducing including transmitting audio data corresponding to at least part of the multimedia data to the wireless earphone via the wireless communication connection such that the audio data is output via the speaker included in the wireless earphone;
obtaining a sound input from an outside of the apparatus while the multimedia data is reproduced at the apparatus;
determining that the sound input received from the outside of the apparatus corresponds to a specified command stored in a memory of the apparatus;
pausing the reproducing of the multimedia data based at least in part on the determining that the sound input corresponds to the specified command;
transmitting an audio indicator corresponding to the specified command to the wireless earphone via the wireless communication connection based at least in part on the pausing of the reproducing of the multimedia data; and
displaying a visual indicator corresponding to the sound input via a touchscreen display of the apparatus based at least in part on the determining that the sound input corresponds to the specified command,
wherein the audio indicator is output via the speaker.

8. The method of claim 7, further comprising displaying a visual indicator corresponding to the specified command via the touchscreen display of the apparatus based at least in part on the determining that the sound input received from the outside of the apparatus corresponds to the specified command stored in the memory.

9. The method of claim 7, further comprising performing the specified command based at least in part on the determining that the sound input received from the outside of the apparatus corresponds to the specified command stored in the memory.

10. The method of claim 7, further comprising:
obtaining the sound input; and
determining that the sound input corresponds to the specified command based at least in part on receiving a touch input to the apparatus.

11. The method of claim 10, further comprising performing the specified command based at least in part on receiving the touch input to the apparatus.

12. The method of claim 7, further comprising:
obtaining a plurality of sound inputs from the outside of the apparatus while the multimedia data is reproduced at the apparatus;
determining that each of the plurality of the sound inputs received from the outside of the apparatus corresponds to respective specified commands stored in the memory; and
performing at least one of the respective specified commands.

13. The method of claim 7, wherein each specified command stored in the memory has a plurality of corresponding sound inputs and a corresponding audio indicator.

14. An apparatus comprising:
communication circuitry;
a display;
a memory to store a specified command; and
at least one processor configured to:
establish, using the communication circuitry, a wireless communication connection between the apparatus and a wireless earphone including a speaker,
reproduce multimedia data, the reproducing including transmitting audio data corresponding to at least part of the multimedia data to the wireless earphone via the wireless communication connection such that the audio data is output via the speaker included in the wireless earphone,
obtain a sound input from an outside of the apparatus while the multimedia data is reproduced at the apparatus,
determine that the sound input received from the outside of the apparatus corresponds to the specified command stored in the memory,
pause the reproducing of the multimedia data based at least in part on the determining that the sound input corresponds to the specified command,
transmit an audio indicator corresponding to the specified command to the wireless earphone via the wireless communication connection based at least in part on the pausing of the reproducing of the multimedia data, and
control the display to display a visual indicator corresponding to the sound input based at least in part on the determining that the sound input corresponds to the specified command,
wherein the audio indicator is output via the speaker.

15. The apparatus of claim 14, wherein the at least one processor is further configured to:
perform the specified command based at least in part on the determining that the sound input received from the outside of the apparatus corresponds to the specified command stored in the memory or receiving a touch input to the apparatus.

16. The apparatus of claim 14, wherein the at least one processor is further configured to:
obtain the sound input and determine that the sound input corresponds to the specified command based at least in part on receiving a touch input to the apparatus.

17. The apparatus of claim 14, wherein the at least one processor is further configured to:
obtain a plurality of sound inputs from the outside of the apparatus while the multimedia data is reproduced at the apparatus,
determine that each of the plurality of the sound inputs received from the outside of the apparatus corresponds to respective specified commands stored in the memory, and
perform at least one of the respective specified commands.

18. The apparatus of claim 14, wherein each specified command stored in the memory has a plurality of corresponding sound inputs and a corresponding audio indicator.

* * * * *